US012084961B2

(12) United States Patent
AlQatari et al.

(10) Patent No.: US 12,084,961 B2
(45) Date of Patent: Sep. 10, 2024

(54) SYSTEM AND METHOD FOR MAPPING A BOREHOLE USING LIDAR

(71) Applicant: Saudi Arabian Oil Company, Dhahran (SA)

(72) Inventors: Ammar AlQatari, Dhahran (SA); Mohamed Larbi Zeghlache, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 141 days.

(21) Appl. No.: 17/453,177

(22) Filed: Nov. 1, 2021

(65) Prior Publication Data
US 2023/0135275 A1    May 4, 2023

(51) Int. Cl.
*E21B 47/085*    (2012.01)
*E21B 47/002*    (2012.01)
*E21B 47/09*    (2012.01)
*G01S 17/89*    (2020.01)

(52) U.S. Cl.
CPC ........ *E21B 47/085* (2020.05); *E21B 47/0025* (2020.05); *E21B 47/09* (2013.01); *G01S 17/89* (2013.01)

(58) Field of Classification Search
CPC ...... G01S 17/89; G01S 17/894; E21B 47/085; E21B 47/0025; E21B 47/002; E21B 47/09
USPC .......................................................... 348/85
See application file for complete search history.

(56) References Cited

U.S. PATENT DOCUMENTS

| | | | |
|---|---|---|---|
| 3,882,945 A | 5/1975 | Kennan, Jr. | |
| 4,779,201 A | 10/1988 | Iizuka et al. | |
| 9,341,474 B2 | 5/2016 | Plangger et al. | |
| 9,671,094 B2* | 6/2017 | Ball | G01S 17/42 |
| 9,703,005 B2 | 7/2017 | Little,III et al. | |
| 9,874,082 B2 | 1/2018 | Tjhang et al. | |

(Continued)

FOREIGN PATENT DOCUMENTS

| | | |
|---|---|---|
| WO | 2021108838 A1 | 6/2021 |
| WO | 2021150237 A1 | 7/2021 |

OTHER PUBLICATIONS

Kharitontseva et al., "An Integrated Approach for Formation Micro-Image Rock Typing Based on Petrography Data: A Case Study in Shallow Marine Carbonates", Geosciences; May 30, 2021.

(Continued)

*Primary Examiner* — John W Miller
*Assistant Examiner* — Sean N. Haiem
(74) *Attorney, Agent, or Firm* — Leason Ellis LLP

(57) ABSTRACT

A system and method map a borehole using LIDAR. The system comprises a tool and a mapping sub-system. The tool includes an intermediate LIDAR sub-system and a distal LIDAR sub-system. The intermediate LIDAR sub-system has an intermediate emitter and an intermediate receiver. The intermediate emitter emits light and the intermediate receiver receives reflected light from the intermediate object. The distal LIDAR sub-system has a distal emitter and a distal receiver. The distal emitter emits light, and the distal receiver receives reflected light from the distal object. The mapping sub-system determines a position of the tool, determines an inner surface of the borehole, and generates and outputs a map of the borehole from the position and the inner surface. A method comprises steps performed during operation of the system.

20 Claims, 4 Drawing Sheets

(56) References Cited

U.S. PATENT DOCUMENTS

| | | | |
|---|---|---|---|
| 9,939,548 B2 | 4/2018 | Burmester et al. | |
| 10,822,879 B2 | 11/2020 | Batarseh | |
| 10,941,644 B2 | 3/2021 | Aljubran et al. | |
| 11,002,075 B1* | 5/2021 | McQuerrey | G05D 1/0234 |
| 2012/0274922 A1* | 11/2012 | Hodge | F41J 5/02 |
| | | | 356/28 |
| 2014/0260590 A1 | 9/2014 | Gerrie | |
| 2018/0299551 A1* | 10/2018 | Bellett | G01S 17/89 |
| 2020/0088873 A1* | 3/2020 | Blakely | G01C 9/06 |
| 2020/0191965 A1* | 6/2020 | Huang | G01S 17/88 |
| 2021/0115781 A1 | 4/2021 | Stark | |
| 2021/0349307 A1* | 11/2021 | Pan | G01S 17/931 |
| 2022/0198192 A1* | 6/2022 | Laing | G06V 10/82 |

OTHER PUBLICATIONS

Boger et al., "Application Of Borehole Imaging Methods for Future Drills on Mars Possibilities for Strain Analysis", 50th Lunar and Planetary Science Conference, Jul. 2019.

Vlachopoulos et al., "Integration among LiDAR-based structural input, DFN generation and DOS technology to describe the rock mass fracture system", ISRM International Symposium, Jun. 2020.

Qinglu et al., "Fracture Patterns and Controlling Factors using LIDAR: An Outcrop Case Study of Kuqa Depression, Tarim Basin, NW China", Society of Petroleum Engineers, Nov. 2016.

\* cited by examiner

SYSTEM AND METHOD FOR MAPPING A BOREHOLE USING LIDAR

FIELD OF THE DISCLOSURE

The present disclosure relates generally to mappings using light detection and ranging (LIDAR), and, more particularly, to a system and method for mapping a borehole using LIDAR.

BACKGROUND OF THE DISCLOSURE

In the oil and gas industry, the use of light beams has been limited to high power applications. Such high power applications are typically destructive, and so have been used for drilling, perforating, and descaling of boreholes, wells, casings, etc. Low power applications of light beams can include LIDAR. LIDAR can employ lasers. The low power applications are not destructive and are less costly to operate. However, such low power applications in the oil and gas industry have not included surface and downhole inspection and evaluation.

SUMMARY OF THE DISCLOSURE

According to an embodiment consistent with the present disclosure, a system and method map a borehole using LIDAR.

In an embodiment, a system comprises a tool and a mapping sub-system. The tool has a longitudinal length extending along a longitudinal axis of the tool, with the tool configured to be positioned in a borehole. The term 'borehole' refers to the inner wall of a well or surface pipelines, regardless of the media, and so can include the wall of a rock formation in an open-hole environment or a cased hole in which metallic or nonmetallic tubular structures line the hole. The tool includes an intermediate LIDAR sub-system and a distal LIDAR sub-system. The intermediate LIDAR sub-system is disposed at an intermediate position along the longitudinal length, with the intermediate LIDAR sub-system having an intermediate emitter and an intermediate receiver. The intermediate emitter emits light in a first direction which is towards an intermediate object in the borehole, and the intermediate receiver receives reflected light from the intermediate object to determine a characteristic of the intermediate object. The distal LIDAR sub-system is disposed at a distal position of the tool, with the distal LIDAR sub-system having a distal emitter and a distal receiver. The distal emitter emits light in a second direction which is towards a distal object in the borehole, and the distal receiver receives reflected light from the distal object to determine a characteristic of the distal object. The mapping sub-system has code therein configured to determine a position of the tool in the borehole from the characteristic of the distal object, to determine an inner surface of the borehole from the characteristic of the intermediate object, and to generate and output a map of the borehole from the position and the inner surface.

Either of the intermediate emitter and the distal emitter is omni-directional. The tool can rotate about the longitudinal axis as either of the intermediate emitter and the distal emitter emits the light. The intermediate object is a portion of the inner surface of the borehole. The mapping sub-system includes an output device configured to display the map to a user.

In another embodiment, a system comprises a tool and a mapping sub-system. The tool has a longitudinal length extending along a longitudinal axis of the tool, with the tool configured to be positioned in a borehole. As should be understood, positioning in a borehole includes positioning within the inner wall of a well or surface pipelines, regardless of the media, and so can include positioning within the wall of a rock formation in an open-hole environment or in a cased hole in which metallic or nonmetallic tubular structures line the hole. The tool includes an intermediate LIDAR sub-system and a distal LIDAR sub-system. The intermediate LIDAR sub-system is disposed at an intermediate position along the longitudinal length, with the intermediate LIDAR sub-system having an intermediate emitter and an intermediate receiver. The intermediate emitter emits light in a first direction which is towards an intermediate object in the borehole, and the intermediate receiver receives reflected light from the intermediate object to determine an intermediate distance of an intermediate portion of the tool from the intermediate object. The distal LIDAR sub-system is disposed at a distal position of the tool, with the distal LIDAR sub-system having a distal emitter and a distal receiver. The distal emitter emits light in a second direction which is towards a distal object in the borehole, and the distal receiver receives reflected light from the distal object to determine a distal distance of a distal portion of the tool from the distal object. The mapping sub-system has code therein configured to determine a position of the tool in the borehole from the distal distance, to determine an inner surface of the borehole from the intermediate distance of the intermediate object, and to generate and output a map of the borehole from the position and the inner surface.

Either of the intermediate emitter and the distal emitter is omni-directional. The tool can rotate about the longitudinal axis as either of the intermediate emitter and the distal emitter emits the light. The intermediate object is a portion of the inner surface of the borehole. The mapping sub-system includes an output device configured to display the map to a user.

In a further embodiment, a method comprises extending a tool in a borehole, emitting a plurality of light beams from the tool toward a plurality of objects in the borehole, receiving reflected light beams from the objects, determining a plurality of distances of the objects by multiplying the round trip travel times of the emitted light beams and the reflected light beams with one half of the value of the speed of light, mapping an inner surface of the borehole and the objects in the borehole using the distances to generate a map of the inner surface and the objects, generating a three-dimensional representation of the inner surfaces and objects using the map, and outputting the three-dimensional representation from an output device.

The light beams can be emitted omni-directionally. At least one object is a portion of the inner surface. The light beams are emitted from a LIDAR device on the tool. The LIDAR device can emit the light beams omni-directionally. The tool can rotate to direct the emitted light beams onto the objects positioned around the tool.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method for mapping a borehole using LIDAR.

Figure 1:
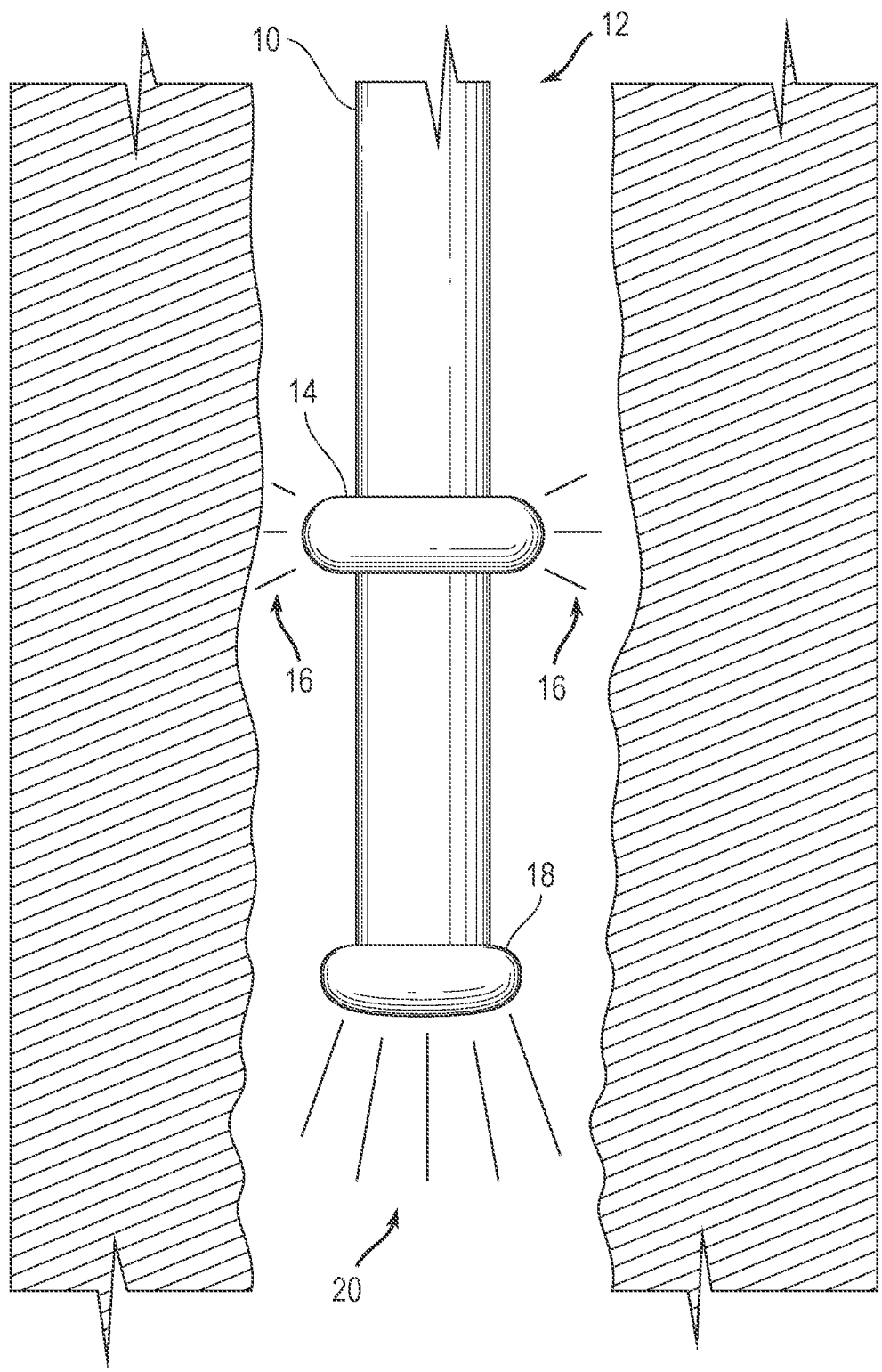
FIG. 1 illustrates a logging tool in a borehole, according to an embodiment.

Referring to FIG. 1, a tool 10 has a longitudinal length extending along a longitudinal axis of the tool 10, with the tool 10 configured to be positioned in a borehole 12. The tool 10 includes an intermediate LIDAR sub-system 14 emitting light 16, and a distal LIDAR sub-system 18 emitting light 20. The light 16, 20 can be laser light. The intermediate LIDAR sub-system 14 is disposed at an intermediate position along the longitudinal length of the tool 10. The distal LIDAR sub-system 18 is disposed at a distal position of the tool 10. The light 16 can be directed omni-directionally. The light 20 can be directed generally distally away from the tool 10.

Figure 2:
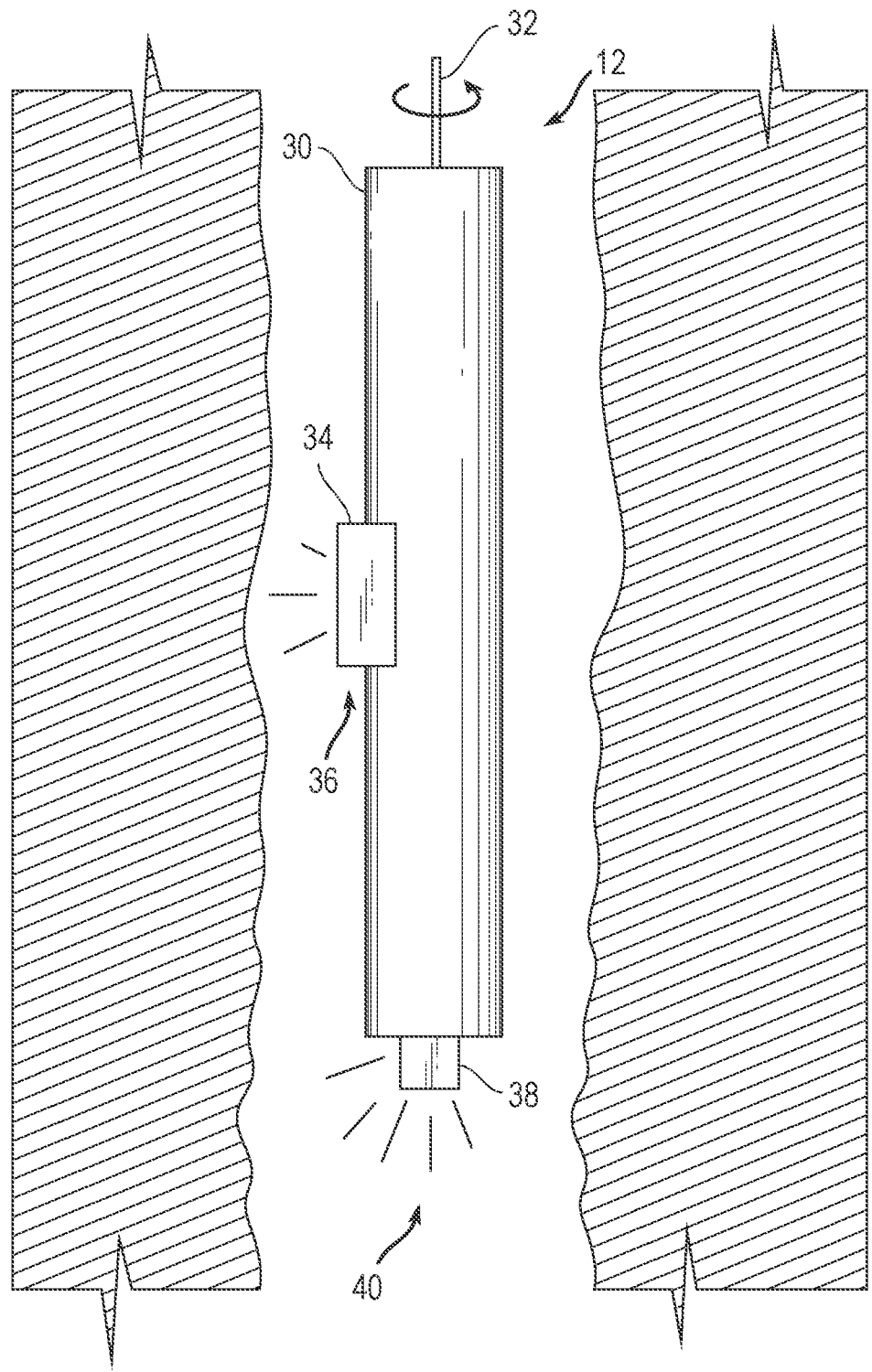
FIG. 2 illustrates a logging tool in a borehole, according to an alternative embodiment.

In an alternative embodiment shown in FIG. 2, a tool 30 has a longitudinal length extending along a longitudinal axis of the tool 30, with the tool 30 configured to be positioned in a borehole 12. The tool 30 includes an intermediate LIDAR sub-system 34 emitting light 36, and a distal LIDAR sub-system 38 emitting light 40. The light 36, 40 can be laser light. The intermediate LIDAR sub-system 34 is disposed at an intermediate position along the longitudinal length of the tool 30. The distal LIDAR sub-system 38 is disposed at a distal position of the tool 30. The light 36 is emitted in a limited arc from the tool 30. The tool 30 can rotate about an axis 32. In an alternative embodiment, the tool 30 can have a body which is stationary and does not rotate, while the sub-systems 34, 38 rotate about the axis 32.

During rotation of the tool 30 or the sub-systems 34, 38, the light 36 can sweep about the tool 30, and so is directed omni-directionally from the tool 30. The light 40 can be directed generally distally away from the tool 30 in a predetermined arc. During rotation of the tool 30, the light 40 can be directed in an expanded arc about the distal end of the tool 30, with the expanded arc being greater than the predetermined arc. Accordingly, using rotation of the tool 30 and movement of the tool 30 through the borehole 12, the LIDAR sub-systems 34, 38 sweep a wide range of objects surrounding the tool 30. Such sweeps of LIDAR from the tool 30 can form a spiral pattern of detection of objects in the borehole 12.

Figure 3:
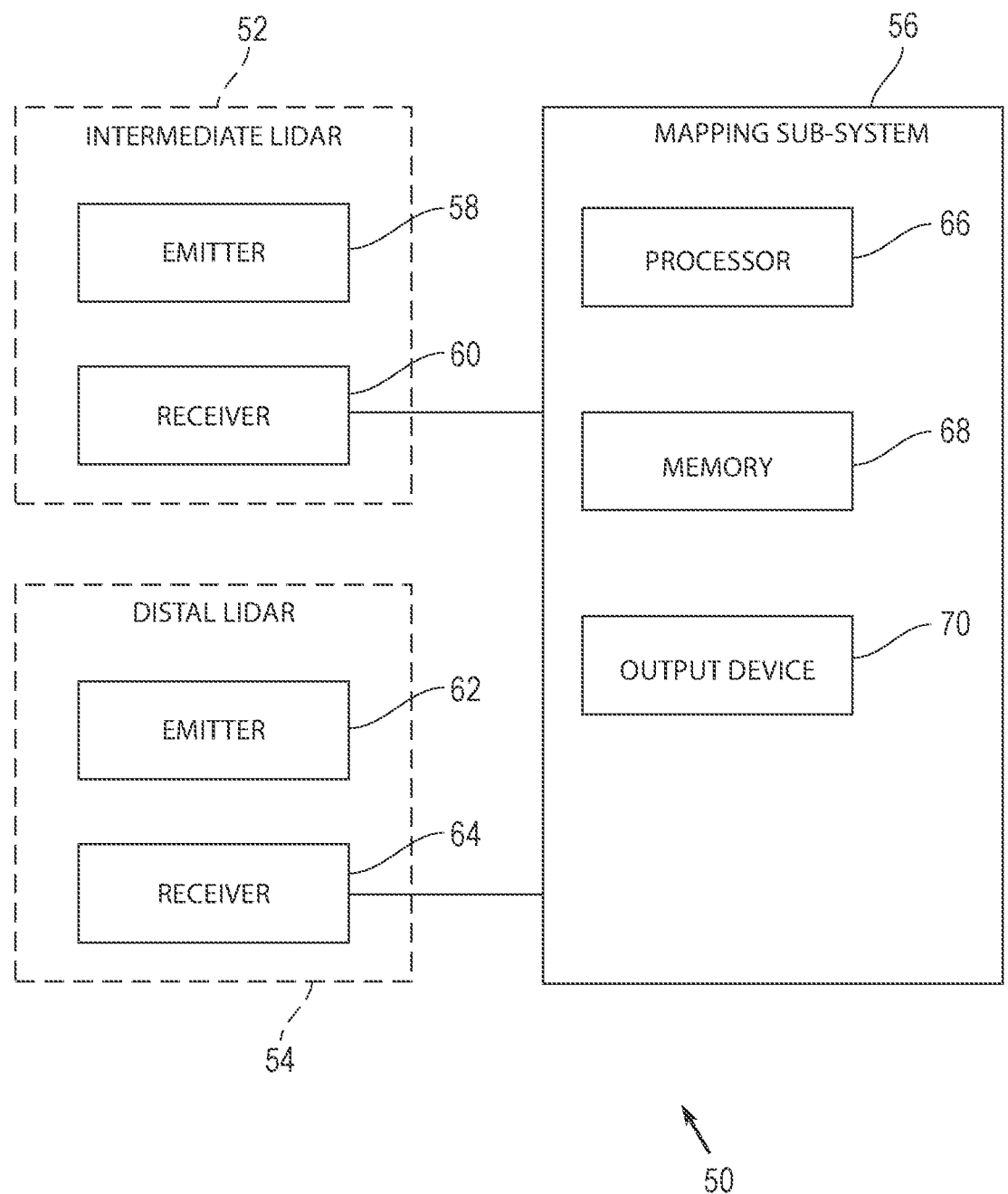
FIG. 3 is a schematic of a system using the logging tools of FIGS. 1-2.

Referring to FIG. 3, a system 50 includes an intermediate LIDAR sub-system 52, such as described above, and a distal LIDAR sub-system 54, such as described above. The intermediate LIDAR sub-system 52 and the distal LIDAR sub-system 54 are communicatively coupled to a mapping sub-system 56. For example, the sub-systems 52, 54 can be connected to the mapping sub-system 56 by a transmission line extending through the longitudinal length of the tool 10, 30. Alternatively, the sub-systems 52, 54 can be wirelessly connected to the mapping sub-system 56.

The intermediate LIDAR sub-system 52 has an intermediate emitter 58 and an intermediate receiver 60. The intermediate emitter 58 can be a laser. The intermediate receiver 60 can be a photodiode. The intermediate emitter 58 emits light in a first direction which is towards an intermediate object in the borehole 12, and the intermediate receiver 60 receives reflected light from the intermediate object to determine a characteristic of the intermediate object. The distal LIDAR sub-system 54 has a distal emitter 62 and a distal receiver 64. The distal emitter 62 can be a laser. The distal receiver 60 can be a photodiode. The distal emitter 62 emits light in a second direction which is towards a distal object in the borehole 12, and the distal receiver 64 receives reflected light from the distal object to determine a characteristic of the distal object.

The mapping sub-system 56 includes a hardware processor 66, a memory 68, and an output device 70. The hardware processor 66 has code therein configured to determine a position of the tool 10, 30 in the borehole 12 from the characteristic of the distal object, to determine an inner surface of the borehole 12 from the characteristic of the intermediate object, and to generate and output a map of the borehole 12 from the position and the inner surface. The hardware processor 66 can be a microprocessor. The memory 68 can store the code as well as data representing the position, information on the inner surface, and the map. The output device 70 can be a display which can output the position data, the information on the inner surface, and the map.

Figure 4:
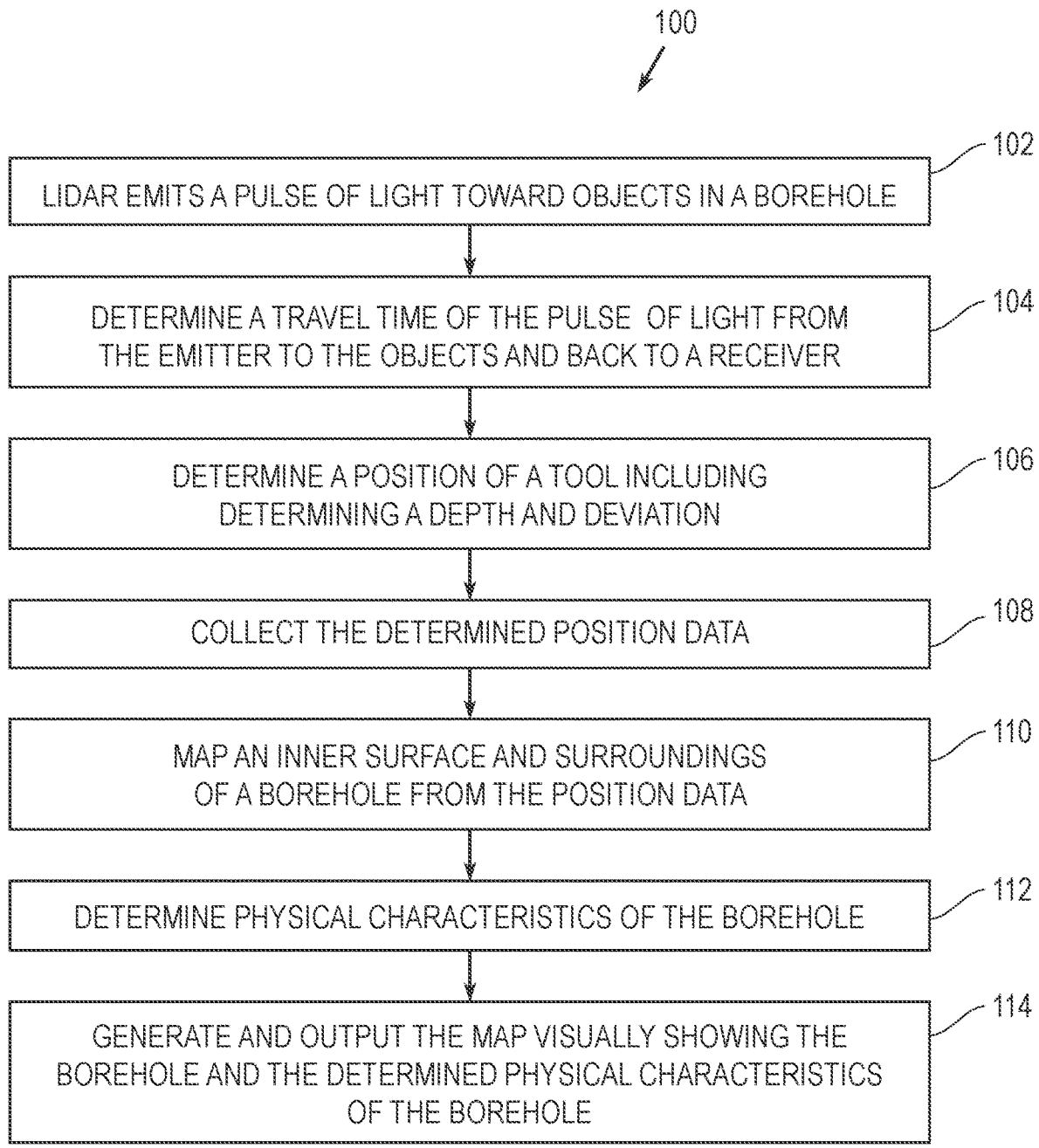
FIG. 4 is a flowchart of operation of the system of FIG. 3.

As shown in FIG. 4, a method 100 includes a LIDAR sub-system emitting a pulse of light toward objects in a borehole 12 in step 102, and determining, using a programmed processor as described above, a travel time of the pulse of light from the emitter to the objects and back to a receiver in step 104. The travel time is used to determine a plurality of distances of the objects by multiplying the round trip travel times of the emitted light beams and the reflected light beams with one half of the value of the speed of light. The method 100, using a programmed processor, then determines a position of the tool 10, 30 in the borehole 12 in step 106. The method 100 then collects the determined position data within a memory, as indicated at step 108, and maps an inner surface and surroundings of the borehole 12 from the position data in step 110, using code executing in the processor to arrange the position data in the positions so-determined. The method 100 also determines physical characteristics of the borehole 12 in step 112. The physical characteristics can include the volume of portions of the borehole 12. These determinations, like others, are done using a processor that is configured by code executing therein. The method 100 then generates and outputs a map which visually displays the borehole 12 and the determined physical characteristics of the borehole 12 in step 114. The map is used to generate a three-dimensional representation of the inner surfaces and objects. The three-dimensional representation is output from the output device 70. Such generation of a map and a three-dimensional representation of a borehole using LIDAR can be performed by a system and method as described in U.S. Patent Publication No. US 2021/0183224 A1, which is incorporated herein by reference.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
   a tool having a longitudinal length extending along a longitudinal axis of the tool, with the tool configured to be positioned in a borehole, the tool including:
      a distal LIDAR sub-system disposed at a distal position of the tool, with the distal LIDAR sub-system having a distal emitter and a distal receiver, wherein the distal emitter emits a first light in a first direction along the longitudinal axis which is towards a distal object in the borehole, and wherein the distal receiver receives reflected light from the distal object to determine a characteristic of the distal object;
      an intermediate LIDAR sub-system disposed at an intermediate position along the longitudinal length, with the intermediate LIDAR sub-system having an intermediate emitter and an intermediate receiver, wherein the intermediate emitter emits a second light in a second direction perpendicular to the longitudinal axis and which is towards an intermediate object in the borehole, wherein the intermediate emitter emits the second light in the second direction after the distal emitter emits the first light in the first direction, and wherein the intermediate receiver receives reflected light from the intermediate object to determine a characteristic of the intermediate object; and
      a mapping sub-system including a hardware processor having code therein configured to determine a position of the tool in the borehole from the characteristic of the distal object, and then to determine an inner surface of the borehole from the characteristic of the intermediate object after determining the position of the tool from the characteristic of the distal object using the distal receiver, and then to generate and output a map of the borehole from the position of the tool and from the inner surface.

2. The system of claim 1, wherein the intermediate emitter is omni-directional.

3. The system of claim 1, wherein the distal emitter is omni-directional.

4. The system of claim 1, wherein the tool rotates about the longitudinal axis as the intermediate emitter emits the second light.

5. The system of claim 1, wherein the tool rotates about the longitudinal axis as the distal emitter emits the first light.

6. The system of claim 1, wherein the intermediate object is a portion of the inner surface of the borehole.

7. The system of claim 1, wherein the mapping sub-system includes an output device configured to display the map to a user.

8. A system, comprising:
   a tool having a longitudinal length extending along a longitudinal axis of the tool, with the tool configured to be positioned in a borehole, the tool including:
      a distal LIDAR sub-system disposed at a distal position of the tool, with the distal LIDAR sub-system having a distal emitter and a distal receiver, wherein the distal emitter emits a first light in a first direction along the longitudinal axis which is towards a distal object in the borehole, and wherein the distal receiver receives reflected light from the distal object to determine a distal distance of a distal portion of the tool from the distal object;
      an intermediate LIDAR sub-system disposed at an intermediate position along the longitudinal length, with the intermediate LIDAR sub-system having an intermediate emitter and an intermediate receiver, wherein the intermediate emitter emits a second light in a second direction perpendicular to the longitudinal axis and which is towards an intermediate object in the borehole, wherein the intermediate emitter emits the second light in the second direction after the distal emitter emits the first light in the first direction, and wherein the intermediate receiver receives reflected light from the intermediate object to determine an intermediate distance of an intermediate portion of the tool from the intermediate object; and a mapping sub-system including a hardware processor having code therein configured to determine a position of the tool in the borehole from the distal distance of the distal portion of the tool from the distal object, and then to determine an inner surface of the borehole from the intermediate distance of the intermediate object after the determining of the position of the tool from the distal distance using the distal receiver, and then to generate and output a map of the borehole from the position of the tool and from the inner surface.

9. The system of claim 8, wherein the intermediate emitter is omni-directional.

10. The system of claim 8, wherein the distal emitter is omni-directional.

11. The system of claim 8, wherein the tool rotates about the longitudinal axis as the intermediate emitter emits the second light.

12. The system of claim 8, wherein the tool rotates about the longitudinal axis as the distal emitter emits the first light.

13. The system of claim 8, wherein the intermediate object is a portion of the inner surface of the borehole.

14. The system of claim 8, wherein the mapping sub-system includes an output device configured to display the map to a user.

15. A method, comprising:
providing a mapping sub-system including a memory and a hardware processor having code therein;
extending a tool having a longitudinal axis in a borehole;
emitting a first light beam in a first direction along the longitudinal axis from the tool toward a distal object in the borehole;
emitting a second light beam in a second direction perpendicular to the longitudinal axis from the tool towards at least one intermediately positioned object in the borehole, wherein the second light beam is emitted after the first light beam;

receiving reflected light beams from the distal object at a distal receiver and the at least one intermediately positioned object at an intermediate receiver;
determining a distal distance of the distal object using a distal receiver and determining an intermediate distance of the at least one intermediately positioned object using an intermediate receiver, by multiplying the round trip travel times of the emitted light beams and the reflected light beams with one half of the value of the speed of light;
then determining, using the hardware processor having the code therein, a position of the tool in the borehole from a characteristic of the distal object including the distal distance;
then collecting the position of the tool determined from the characteristic of the distal object as position data in the memory;
then determining an inner surface of the borehole from a characteristic of the at least one intermediately positioned object including the intermediate distance;
then generating and outputting a map of the inner surface, of the distal object, and of the at least one intermediately positioned object from the position data generated from the characteristic of the distal object including the distal distance, to map the inner surface and surroundings of the borehole from the position data including the position of the tool determined from the characteristic of the distal object, thereby generating the map of the inner surface, the distal object, and the at least one intermediately positioned object;
then generating a three-dimensional representation of the inner surfaces and distal object and the at least one intermediately positioned object using the map; and
then outputting the three-dimensional representation from an output device.

16. The method of claim 15, wherein the light beams are emitted omni-directionally.

17. The method of claim 15, wherein the at least one intermediately positioned object is a portion of the inner surface.

18. The method of claim 15, wherein the light beams are emitted from a LIDAR device on the tool.

19. The method of claim 18, wherein the LIDAR device emits the light beams omni-directionally.

20. The method of claim 18, wherein the tool rotates to direct the second light beam onto the at least one intermediately positioned object around the tool.

* * * * *